No. 683,015. Patented Sept. 24, 1901.
W. F. BARNES.
CROSSCUT GANG SAW.
(Application filed Feb. 1, 1901.)
(No Model.) 2 Sheets—Sheet 2.
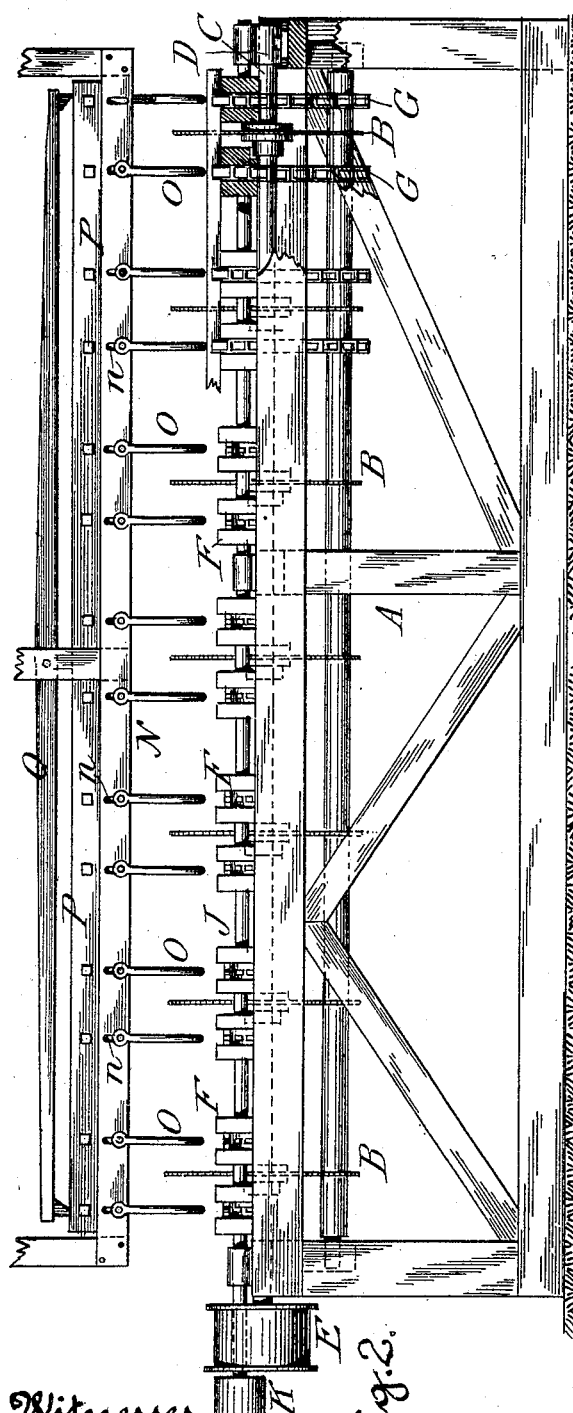
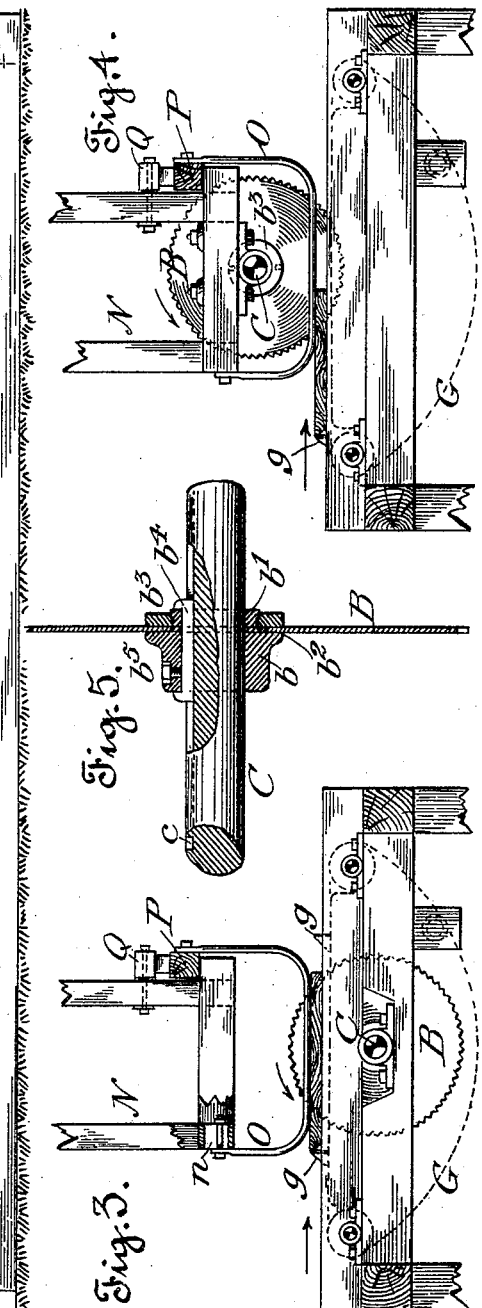
Witnesses.
Inventor.
Willard F. Barnes
by Spear Seely
Attorney
THE NORRIS PETERS CO., PHOTO-LITHO., WASHINGTON, D. C.

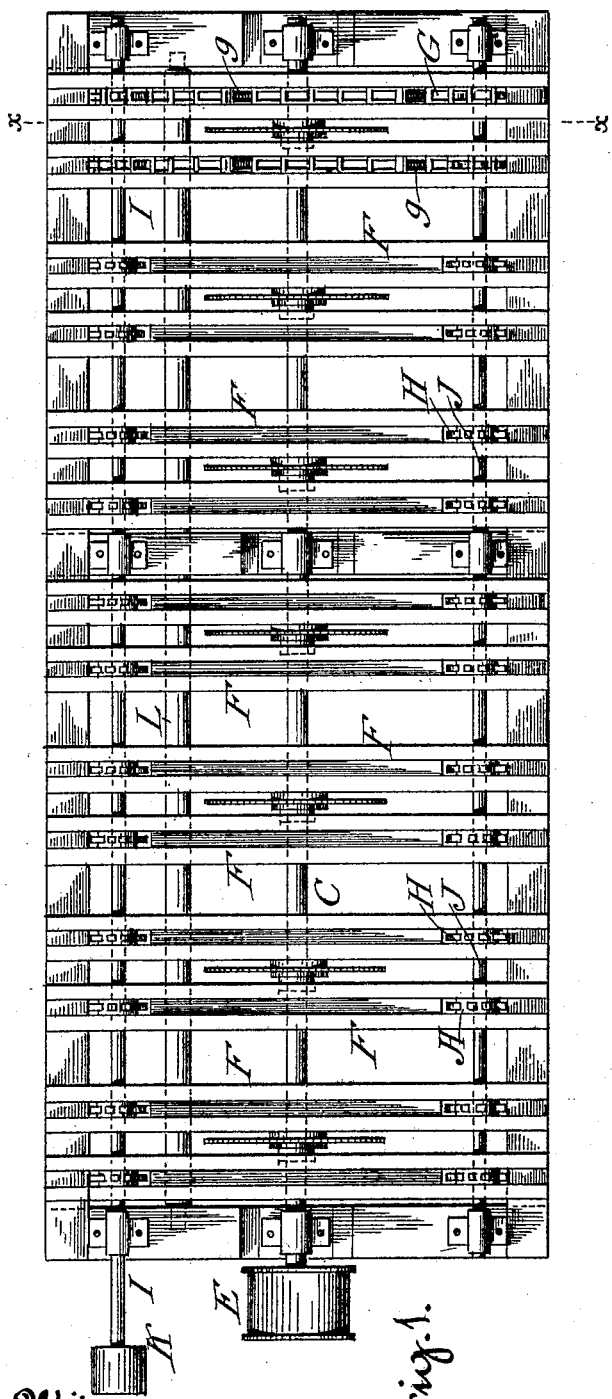

UNITED STATES PATENT OFFICE.

WILLARD F. BARNES, OF KLAMATHON, CALIFORNIA.

CROSSCUT GANG-SAW.

SPECIFICATION forming part of Letters Patent No. 683,015, dated September 24, 1901.

Application filed February 1, 1901. Serial No. 45,612. (No model.)

*To all whom it may concern:*

Be it known that I, WILLARD F. BARNES, a citizen of the United States, residing at Klamathon, in the county of Siskiyou and State of California, have invented certain new and useful Improvements in Crosscut Gang-Saws, of which the following is a specification.

My invention relates to sawing machinery, and more particularly to crosscut gang-saws for sawing boards into short lengths. This is usually done by skilled operators with single saws and is slow and laborious, requiring great care and accuracy in the operator. For such work as filling large orders for box-lumber, in which great quantities of sides, ends, &c., of standard sizes must be furnished, it is practicable to use a large number of saws in a gang, provided the holding and feeding of the lumber can be done with sufficient accuracy to secure good results and avoid waste. Moreover, if such accuracy be secured a large amount of skilled labor can be dispensed with, since the preliminary placing of the lumber in proper position for feeding is all that is required of the operator. The machine which is the subject of this description fulfils these requirements, as will be fully hereinafter explained in connection with the accompanying drawings.

In the drawings, Figure 1 is a plan view. Fig. 2 is a front elevation. Fig. 3 is an end elevation showing a pressure device for the lumber. Fig. 4 is a similar view to illustrate a different manner of supporting the saws. Fig. 5 is a detail section of the saw-arbor to show the manner of securing the saws thereto.

The supporting-frame A is of sufficient length to carry a gang of the desired number of saws B. Seven saws are shown in the drawings; but in practice I have used a larger number, sufficient to crosscut the longest lumber into suitable lengths. The saw-arbor C is journaled in bearings D, secured in recesses $a$ of transverse beams A' of the frame and carries at its end the pulley E, through which it derives motion from any suitable power. The arbor has a continuous keyway $c$, which extends from end to end. Each saw is adjustably mounted upon the arbor in the peculiar manner shown in Fig. 7. A collar $b$, having a threaded boss $b'$, receives the saw, which is held up against the shoulder $b^2$ by the clamping-plate $b^3$, threaded upon the boss. The parts are all fixed in place by the double-headed gib-key $b^4$, which fits the keyway $c$ and a coinciding groove in the collar. The gib is held by a set-screw $b^5$, which passes through the collar and bears upon it. It will be noted that the set-screw does not bear upon the arbor, whose keyway is thus kept free from defacement and perfectly true. The collars and saws are assembled with the gib and all slipped over the end of the arbor and then adjusted to their proper positions on the arbor and the arbor and saws dropped into the bearings on the frame-beams.

Forming a part of the main frame are transverse timbers F, which are preferably arranged in pairs, a saw being between each pair. These timbers are grooved superficially to form horizontal guides for the carrying-chains G, which are thus kept in perfect line and below the surface of the timbers. The chains are simultaneously driven at the same rate of speed by the sprockets H on the longitudinal shafts I J, one of which shafts has a pulley K. The chains hang loosely beneath the frame and are prevented from rising, swinging, or in any way interfering with the saws by the longitudinal bar L. At intervals in the extent of the chain are secured lugs $g$, which are arranged opposite one another in pairs and which project above the guide-grooves. The lumber to be sawed is not carried by the chains, but lies on the timbers of the frame, which practically form a level slotted table and is moved by the lugs $g$ against the whole gang of saws simultaneously and accurately.

The front longitudinal beam of the upper frame N has a series of vertical slots $n$, in each of which is adjustably secured one end of a curved pressure-bar O, the adjustment providing for different thicknesses of lumber. These bars press upon the lumber at intervals, and their rear ends are carried up and secured to a rear beam P, which can rest loosely upon the frame and can yield freely upwardly. Secured in the frame is a spring Q, which may be of wood and whose free ends bear upon the beam P and act as an equalizer of the motion of said beam, which rises slightly as the lumber passes under the pressure-bars and maintains the pressure equally upon such lumber throughout its length. Obviously a metal spring or series of springs can be substituted for the one shown; but in practice I have found such a wooden spring to afford a very cheap, simple, and practical equalizer.

Fig. 6, besides showing the construction just described, illustrates a modified mounting of the saw-arbor, the bearings for the same being in the upper frame N. This frame is suspended from the roof or otherwise supported in the position relatively to the lower frame shown in the drawings.

Since the sprockets are all secured upon a common shaft and positively drive all the chains at the same rate of speed, and since the carrier-lugs are secured to the chains at uniform intervals, and since the lumber is held flat to a stationary surface and cannot yield, it follows that such lumber must be presented accurately to the whole gang of saws. These contrivances for securing accurate presentation of the lumber make it possible to employ common unskilled labor to operate the machine, there being nothing for the operator to attend to excepting the placing of the lumber properly against the series of lugs which propel it. The gains in time and production by the sawing of long boards into many short lengths simultaneously are self-evident.

Having thus fully described my invention, what I claim as new, and desire to secure by Letters Patent, is—

1. In a sawing-machine, the combination with the lumber-support, gang of saws and chain-carriers, of bars having one of their ends adjustable above the lumber-support, a loose beam to which all their other ends are connected, and which maintains said bars in contact with the lumber.

2. In a sawing-machine, the combination with a support for lumber, means for moving lumber along it, and a gang of saws, of pressure-bars adapted to rest upon the lumber, a loose beam to which all of said bars are connected, and which maintains their pressure; and an equalizing-spring for said beam.

In testimony whereof I have affixed my signature, in presence of two witnesses, this 26th day of November, 1900.

WILLARD F. BARNES.

Witnesses:
H. L. SWIFT,
R. M. RICHARDSON.